(12) United States Patent
Rehman et al.

(10) Patent No.: US 6,572,690 B2
(45) Date of Patent: Jun. 3, 2003

(54) USE OF MIXTURES OF ORGANIC ACIDS TO ADJUST PROPERTIES OF INK-JET INKS

(75) Inventors: Zia Rehman, Corvallis, OR (US); Dennis P Parazak, Oceanside, CA (US); Raymond J Adamic, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 09/800,450

(22) Filed: Mar. 5, 2001

(65) Prior Publication Data

US 2002/0162481 A1 Nov. 7, 2002

(51) Int. Cl.$^7$ .............................................. C09D 11/02
(52) U.S. Cl. .................................. 106/31.58; 106/31.86
(58) Field of Search ........................... 106/31.58, 31.86

(56) References Cited

U.S. PATENT DOCUMENTS

| | | | |
|---|---|---|---|
| 5,106,416 A | 4/1992 | Moffatt et al. ........... | 106/31.27 |
| 5,181,045 A | 1/1993 | Shields et al. ................ | 346/1.1 |
| 5,679,143 A | 10/1997 | Looman ................... | 106/31.27 |
| 5,695,820 A | 12/1997 | Davis et al. ................ | 427/261 |
| 5,785,743 A * | 7/1998 | Adamic et al. ........... | 106/31.27 |
| 5,853,465 A | 12/1998 | Tsang et al. .............. | 106/31.25 |
| 5,902,387 A * | 5/1999 | Suzuki et al. ............. | 106/31.47 |
| 6,036,759 A | 3/2000 | Wickramanayake et al. ........................ | 106/31.28 |
| 6,231,653 B1 * | 5/2001 | Lavery et al. ............ | 106/31.36 |
| 6,247,808 B1 * | 6/2001 | Ma et al. .................... | 347/100 |
| 6,254,231 B1 * | 7/2001 | Suzuki et al. ................ | 347/106 |
| 6,319,309 B1 * | 11/2001 | Lavery et al. ............ | 106/31.27 |
| 6,395,077 B1 * | 5/2002 | Malhotra .................. | 106/31.29 |

FOREIGN PATENT DOCUMENTS

| EP | 0997506 A1 | 5/2000 |
|---|---|---|
| GB | 2332438 A | 6/1999 |
| WO | WO98/44057 | 10/1998 |

* cited by examiner

*Primary Examiner*—Helene Klemanski

(57) ABSTRACT

Ink-jet ink compositions are described comprising a mixture of succinic acid and at least one second organic acid. The ink-jet ink compositions alleviate color bleed, and lead to reliable pen performance when incorporated in a pen architecture.

8 Claims, 1 Drawing Sheet

USE OF MIXTURES OF ORGANIC ACIDS TO ADJUST PROPERTIES OF INK-JET INKS

FIELD OF THE INVENTION

The present invention relates to color ink compositions for ink-jet printing, and more particularly, to color ink compositions that enhance pen performance while minimizing color bleed.

BACKGROUND OF THE INVENTION

The combination of low cost and high quality output have recently made ink-jet printers a popular alternative to other types of non-impact printers such as laser printers.

The ink-jet printing process involves the ejection of fine droplets of ink onto a print medium such as paper in response to electrical signals generated by a microprocessor. Typically, an ink-jet printer utilizes a pen set mounted on a carriage that is moved relative to the surface of a print medium. In commercially available ink-jet color printers, such as the DESKJET™ printer available from Hewlett-Packard Company, a four-pen set including cyan, yellow, magenta and black inks is generally employed to achieve the necessary color combinations.

A typical pen includes print heads with orifice plates that have very small nozzles (typically 10–50 μm diameter) through which the ink droplets are ejected. Adjacent to these nozzles are ink chambers where ink is stored prior to ejection. Ink drop ejection is currently achieved either thermally or piezoelectrically. In thermal ink-jet printing, each nozzle is associated with a resistor element. Each resistor element is in turn connected to a microprocessor, whose signals direct one or more resistor elements to heat up rapidly. This causes a rapid expansion of ink vapor that forces a drop of ink through the associated nozzle onto the print medium. In piezoelectric ink-jet printing, ink droplets are ejected due to the vibrations of piezoelectric crystals stimulated by electrical signals generated by the microprocessor.

Interactions between the ink and pen architecture (e.g. the resistor element, nozzle, etc.) strongly influence the reliability of pen performance. In addition, interactions between the ink and both the surface and bulk of the print medium play a key role in determining print quality. A significant amount of research has recently been conducted to produce improved ink compositions for ink-jet printers that exhibit favorable interactions with both the pen architecture and the print medium.

A variety of complex interactions between the ink and pen architecture can affect both the short and long term reliability of pen performance. For example, kogation, defined as the build up of residue on the surface of resistor elements as a result of repeated firings, can cause individual thermal heaters to fail, leading to a gradual degradation in pen performance.

Puddling and crusting relate respectively to the formation of ink puddles and insoluble crusts on the orifice plates of the printhead. Such obstructions lead to poor drop ejection characteristics (e.g. drop volume, velocity and direction), and hence to a degradation in print quality. Again, ink composition plays an important role in determining the extent of these two phenomena; the low surface tension of surfactant containing inks may cause puddling, while the evaporation of a volatile ink composition could lead to crusting.

In addition to the aforementioned properties affecting the reliability of the pens of a given pen set, a particular concern for color ink-jet printing, has been the mixing or "bleeding" that occurs both on the surface and within the print medium when inks of two different colors are printed side by side. Bleeding may cause undesired color formation at the interface (e.g. when cyan and yellow mix to give green) and a concurrent loss of color separation, resolution, and edge acuity. The more contrasting the two adjacent liquids are in color (e.g. black and yellow), the more visual the bleed. Several methods, including reducing dry times and increasing penetration rates, have been proposed to reduce bleed of adjacent printing liquids. In addition, pH-sensitive dyes may also be employed to control bleed.

U.S. Pat. No. 5,181,045 (incorporated by reference herein) discloses a method of ink-jet printing wherein one ink (a pH sensitive ink, usually a black ink) contains a colorant that becomes insoluble under defined pH conditions, and a second ink (the target ink, usually a color ink) has a pH that renders the colorant contained in the first ink insoluble. To completely control bleed, this method typically requires a pH differential of 4–5 units between the two inks. Accordingly, an ink with a pH not exceeding 4 would be preferred to effectively eliminate bleed from a pH-sensitive ink having a pH of 8.

U.S. Pat. No. 5,785,743 (incorporated by reference herein) discloses that the addition of an organic acid component to the so-called target ink composition reduces the pH differential required to control bleed to as little as 1–3 units. As a result, the pH of the target ink could be as high as 7 and still eliminate bleed from an encroaching pH-sensitive ink having a pH of 8, thereby reducing some of the corrosion risks associated with low pH inks.

SUMMARY OF THE INVENTION

The invention is an ink-jet ink composition. The composition comprises at least one colorant and a vehicle. The vehicle includes a mixture of succinic acid and at least one second organic acid. The second organic acid may be a monofunctional, difunctional or polyfunctional organic acid. The second organic acid may be glutaric acid, oxalic acid, maleic acid, methylsuccinic acid, malonic acid, adipic acid, fumaric acid, dihydroxyfumaric acid, malic acid, mesaconic acid, itaconic acid, phthalic acid, isophthalic acid, terephthalic acid, aspartic acid, glutamic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbomene tetracarboxylic acid, 3,3', 4,4'-benzophenone tetracarboxylic acid, 1,2,3,4,5,6-benzene hexacarboxylic acid, acetic acid, polyacrylic acid, glycolic acid, and derivatives thereof. Preferably the second organic acid is glutaric acid.

The concentration of succinic acid may be from about 2 to about 8 wt %, for example from about 3 to about 6 wt %. The concentration of glutaric acid may be from about 0.1 to about 4 wt %, for example from about 0.5 to about 1.5 wt %.

The vehicle may further include from about 0.1 to about 7 wt % surfactants and from about 5 to about 25 wt % organic cosolvents.

BRIEF DESCRIPTION OF THE DRAWING

The invention is described with reference to the sole FIGURE of the drawing, in which.

DETAILED DESCRIPTION

Figure 1A:
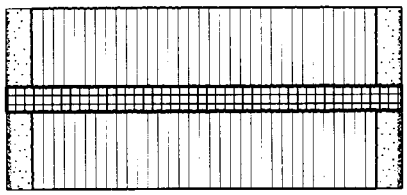
FIG. 1 is a series of photographs of cross-hatchings in which a pigment black ink was printed adjacently to a series of magenta color inks.

The invention will now be described in detail with particular reference to aqueous ink-jet ink compositions and the materials therein.

A. Ink Compositions

Exemplary embodiments of the ink compositions comprise, by weight (all percents are by weight unless otherwise indicated) from 0.01 to 50%, preferably from 5 to 25% organic cosolvents; from 0 to 40%, preferably from 0.1 to 7% surfactants; from 3 to 12% mixed organic acids; and from 0.5 to 10% dye. The remainder of the ink compositions are mostly water; however, other components such as biocides that inhibit growth of microorganisms; chelating agents such as EDTA that eliminate deleterious effects of heavy metal impurities; buffers; and viscosity modifiers or other acrylic and non-acrylic polymers, may be added to improve various properties of the ink composition.

In a preferred embodiment of the invention, the ink compositions comprise, by weight, about 18% organic cosolvents, about 6% surfactants, about 6% mixed organic acid, and about 4% dye.

B. Ink Composition Materials

1. Organic Cosolvents

One or more organic cosolvents may be used to prepare the ink compositions of the present invention. In a preferred embodiment, the organic cosolvents are water-soluble. Exemplary water-soluble organic cosolvents suitable for this purpose include, but are not limited to, aliphatic alcohols, aromatic alcohols, diols, triols, amides, ketones, polyketones or ketoalcohols, nitrogen-containing heterocyclic ketones, ethers, glycol ethers, poly(glycol) ethers, alkylene glycols, polyalkylene glycols, thioglycols containing alkylene groups, lower alkyl ethers of polyhydric alcohols and lactams. The concentration of the organic cosolvents may range from 0.01 to 50 wt %, preferably from 5 to 25 wt %.

2. Surfactants

One or more water soluble surfactants may be employed in the formulation of a vehicle for the ink. For convenience, examples of surfactants are divided into two categories: (1) non-ionic and amphoteric and (2) ionic. The former class includes the alkyl polyethylene oxides (POEs); alkyl phenyl POEs; ethylene oxide/propylene oxide block copolymers; acetylenic POEs; POE esters; POE diesters; POE amines; POE amides; and dimethicone copolyols. U.S. Pat. No. 5,106,416 (incorporated by reference herein) discusses many of the surfactants listed above in greater detail. Amphoteric surfactants such as substituted amine oxides or members of the Octyl dimethyl glycine family of octylamine choloroacetic adducts are also useful in the practice of this invention. Cationic surfactants such as protonated POE amines, and anionic surfactants such as diphenyl sulfonate derivatives like, but not limited to, sodium hexadecyl diphenyloxide disulfonate, and ethoxylated oleoalcohol phosphate esters may also be used.

Non-ionic/amphoteric surfactants are preferred over the ionic surfactants. Specific examples of surfactants that are preferably employed in the practice of this invention include Secondary alcohol ethoxylate, SURFYNOL™ CT-11, Octyl dimethyl glycine, Sodium hexadecyl diphenyloxide disulfonate, Oleyl triethoxy mono diphosphate, isohexadecyl ethylene oxide 20 (available from the ICI Group as ARLASOLVE™ 200), and amine oxides such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide. The ink composition of the present invention comprises by weight from 0 to 40%, preferably from 0.1 to 7%, surfactants.

3. Organic Acids

Two or more organic acids may be included in the ink compositions of the present invention. As mentioned earlier, the organic acids effectively reduce the pH differential between adjacent inks that is preferentially required to control color bleed. Preferably succinic acid is one of the organic acids. Exemplary organic acids suitable for use as additional organic acids include monofunctional organic acids, difunctional organic acids, and polyfunctional organic acids. These include, but are not limited to, glutaric acid, oxalic acid, maleic acid, methylsuccinic acid, malonic acid, adipic acid, fumaric acid, dihydroxyfumaric acid, malic acid, mesaconic acid, itaconic acid, phthalic acid, isophthalic acid, terephthalic acid, aspartic acid, glutamic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbomene tetracarboxylic acid, 3,3',4,4'-benzophenone tetracarboxylic acid, 1,2,3,4,5,6-benzene hexacarboxylic acid, acetic acid, polyacrylic acid, glycolic acid, and derivatives thereof. Preferably glutaric acid is a second organic acid of the invention. The ink composition of the present invention preferably comprises by weight from 3 to 12% mixed organic acid.

4. Dyes

Suitable dyes for the present invention include but are not limited to aqueous dyes such as Direct Blue 86, Direct Blue 199, Direct Yellow 132, Acid Yellow 132, Direct Red 9, Direct Red 32, Acid Yellow 23, Acid Blue 185, Acid Blue 9, Acid Red 17, Acid Red 52, Acid Red 249, and Reactive Red 180. The ink composition of the present invention preferably comprises by weight from 0.5 to 10% aqueous dye.

EXAMPLES

In order to further illustrate the invention, some exemplary compositions are set forth below.

Example 1

Bleed

Ink-jet ink compositions were prepared as shown in Table 1 (all values are weight percentages unless otherwise indicated):

TABLE 1

| Component | Ink comprising Glutaric acid only | Inks comprising Glutaric and Succinic acids | Ink comprising Succinic acid only |
|---|---|---|---|
| Alkyl diol | 15.0 | 15.0 | 15.0 |
| Polyethylene glycol | 3.3 | 3.3 | 3.3 |
| Octyl dimethyl glycine | 4.4 | 4.4 | 4.4 |
| Secondary alcohol ethyloxylate | 0.7 | 0.7 | 0.7 |
| Sodium hexadecyl diphenyloxide disulfonate | 0.5 | 0.5 | 0.5 |
| Oleyl triethoxy mono diphosphate | 0.4 | 0.4 | 0.4 |
| Succinic acid[1] | 0.0 | 0.9–4.5 | 5.4 |

TABLE 1-continued

| Component | Ink comprising Glutaric acid only | Inks comprising Glutaric and Succinic acids | Ink comprising Succinic acid only |
|---|---|---|---|
| Glutaric acid[1] | 6.0 | 5.0–1.0 | 0.0 |
| Chelating agent | 0.1 | 0.1 | 0.1 |
| Magenta dye | 4.2 | 4.2 | 4.2 |
| Water | balance | balance | balance |
| pH[2] | 4.0 | 4.0 | 4.0 |

[1]All of the inks contain a total of 450 mmol acid per kg.
[2]The pH was adjusted by adding a sufficient amount of strong base i.e. NaOH, KOH etc.

Figure 1D:
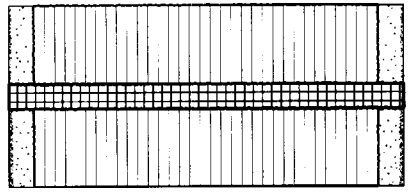
Figure 1B:
Figure 1E:
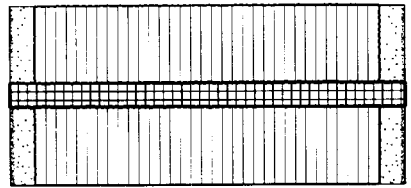
Figure 1C:
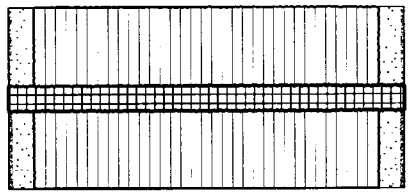
Figure 1F:
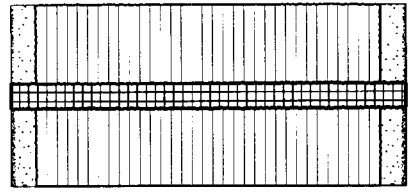
Figure 1G:
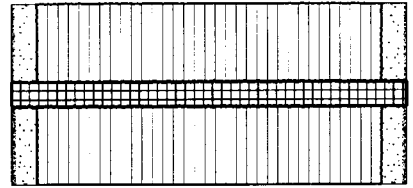

A black to magenta color bleed test was performed on Union Camp JAMESTOWN™ paper using the ink-jet ink compositions of Table 1. The color bleed results obtained are depicted in FIG. 1. The color bleed test involved printing a pigment black ink (used in the HP DESKJET 970 PROFESSIONAL SERIES™ printer) adjacently to a series of magenta color inks. As can be seen from Table 1, the magenta color inks comprised organic cosolvents, surfactants and a magenta dye. In addition the magenta color inks each included 450 mmol organic acid per kg wherein, the molar fraction of glutaric acid was (a) 1.000, (b) 0.833, (c) 0.667, (d) 0.500, (e) 0.333, (f) 0.167 and (g) 0.000 and the remaining fraction consisted of succinic acid. The results shown in FIG. 1, indicate that color bleed is acceptable for all of the inks, and hence that inks containing a mixture of succinic and glutaric acid perform as well as inks that contain succinic or glutaric acid only. Similar results were obtained when the color bleed test was performed on Hewlett-Packard BRIGHT WHITE INKJET™ paper or Champion DATACOPY™ paper.

Example 2

Reliability

The short term and long term decap performance of the ink formulation shown in Table 2 were measured.

TABLE 2

| Component | Ink comprising Glutaric and Succinic acids |
|---|---|
| Alkyl diol | 15.0 |
| polyethylene glycol | 3.5 |
| Octyl dimethyl glycine | 3.8 |
| Secondary alcohol ethoxylate | 0.6 |
| Sodium hexadecyl diphenyloxide disulfonate | 0.5 |
| Oleyl triethoxy mono diphosphate | 0.4 |
| succinic acid | 4.6 |
| glutaric acid | 0.9 |
| chelating agent | 0.1 |
| magenta dye | 4.2 |
| water | balance |
| pH[1] | 4.0 |

[1]The pH was adjusted by adding a sufficient amount of strong base i.e. NaOH, KOH etc.

Short term decap performance describes the period in between successive firings a nozzle can tolerate without a defect. The ink-filled pens were placed in the printer and used to print a so-called "print file" with a predetermined print pattern. The print file was set to cause the nozzles to pause between successive ink drop ejections for predetermined periods of time. The printed nozzle pattern was examined for defects such as weak (i.e. producing low drop volume and/or velocity), misdirected, or non-functional nozzles. The longest inoperative time that a nozzle could withstand between resistor firings without a defect is reported as short term decap. It is desirable that the nozzles tolerate long periods of inactivity between resistor firings, typically short term decap times are required to be longer than 3 seconds. Here, a score of "marginal" was given for decap times in the range 1–3 seconds, of "good" in the range 3–5 seconds, and of "very good" for any decap time longer than 5 seconds. The ink composition of Table 2 exhibited good short term decap performance.

Long term decap performance describes the level of nozzle recovery after the nozzles have been idle for an extended period of time. To test this, the nozzles were left untaped (i.e. exposed to air) at ambient temperature for a period of three days. Following this storage period, the ink-filled pens were placed in the printer and used to print a predetermined "print file." Pen performance was evaluated by measuring the percentage of nozzles that recovered after printing the print file four times without interruption. A nozzle was considered to have recovered if it fired drops of the proper volume and velocity and in the proper location. It is preferred that 100% of the nozzles recover; however, acceptable recovery levels for such a storage period are in the range of 93–100%. Here, a score of "marginal" was given for recovery levels lower than 93%, of "good" in the range 93–97%, and of "very good" in the range 97–100%. The ink composition of Table 2 exhibited very good long term decap performance.

Conclusion

The benefits of the present invention are highlighted when the color bleed data and pen reliability data are combined. In Example 1 it was shown that succinic and glutaric acids can be used interchangeably and as a mixed acid system in an ink composition without any loss of bleed control. In Example 2 it was shown that the mixed acid system exhibits good short term decap times and very good long term decap recovery.

In addition, the use of mixtures of organic acids instead of individual organic acids is even more beneficial when the combined organic acids complement each other in some way. For example, while succinic acid is an irritant at high concentrations, glutaric acid is not. On the other hand, glutaric acid is about an order of magnitude more expensive than succinic acid. A suitable mixture of the two not only exhibits improved pen performance but minimizes toxicity and cost in comparison to an ink composition that comprises only succinic acid or only glutaric acid.

Other embodiments of the invention will be apparent to those skilled in the art from a consideration of the specification or practice of the invention disclosed herein. It is intended that the specification and examples be considered as exemplary only, with the true scope of the invention being indicated by the following claims.

What is claimed is:

1. An ink-jet ink composition, comprising at least one colorant and a vehicle, said vehicle including a mixture of succinic acid and at least one second organic acid having no basic functional group.

2. The inkjet ink composition of claim 1, wherein said second organic acid is selected from the group consisting of monofunctional organic acids, difunctional organic acids, and polyfunctional organic acids.

3. The ink-jet ink composition of claim 2, wherein said second organic acid is selected from the group consisting of glutaric acid, oxalic acid, maleic acid, methylsuccinic acid, malonic acid, adipic acid, fumaric acid, dihydroxyfumaric acid, malic acid, mesaconic acid, itaconic acid, phthalic acid, isophthalic acid, terephthalic acid, aspartic acid, glutamic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, acetic acid, polyacrylic acid, glycolic acid, and derivatives thereof.

4. The ink-jet ink composition of claim 3, wherein said second organic acid is glutaric acid.

5. The ink-jet ink composition of claim 4, wherein the concentration of succinic acid is from about 2 wt % to about 8 wt %, and the concentration of glutaric acid is from about 0.1 wt % to about 4 wt %.

6. The inkjet ink composition of claim 5, wherein the concentration of succinic acid is from about 3 wt % to about 6 wt %, and the concentration of glutaric acid is from about 0.5 wt % to about 1.5 wt %.

7. The inkjet ink composition of claim 1, wherein the vehicle further comprises surfactants and organic cosolvents.

8. The ink-jet ink composition of claim 7, wherein the vehicle comprises from about 0.1 to about 7 wt % surfactants and from about 5 to about 25 wt % organic cosolvents.

* * * * *